Dec. 31, 1957   A. A. BERNARD ET AL   2,818,494
WELDING MACHINE
Original Filed Feb. 12, 1954   2 Sheets-Sheet 2
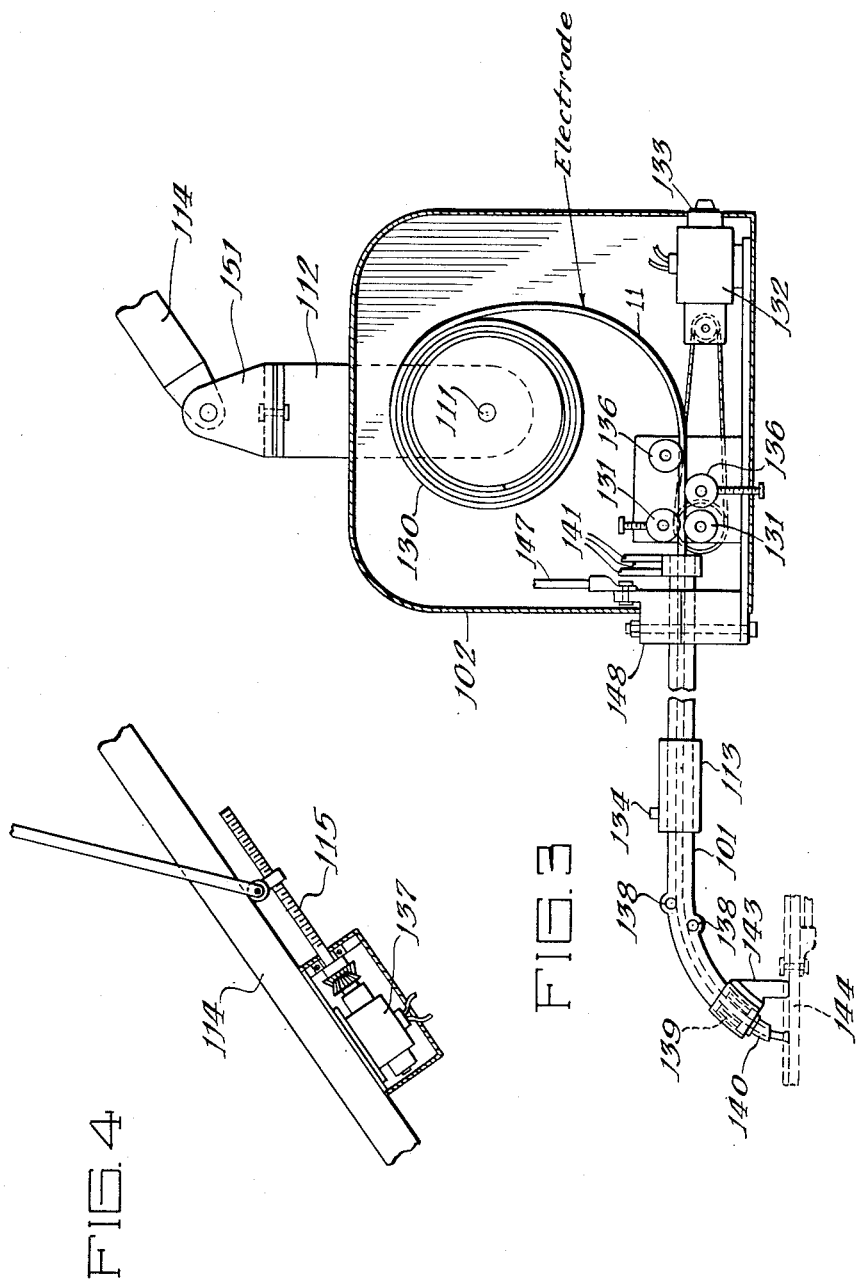
Inventors:
Arthur A. Bernard
Richard A. Bernard
By: Schroeder, Hofgren,
Brady & Wegner
Attorneys

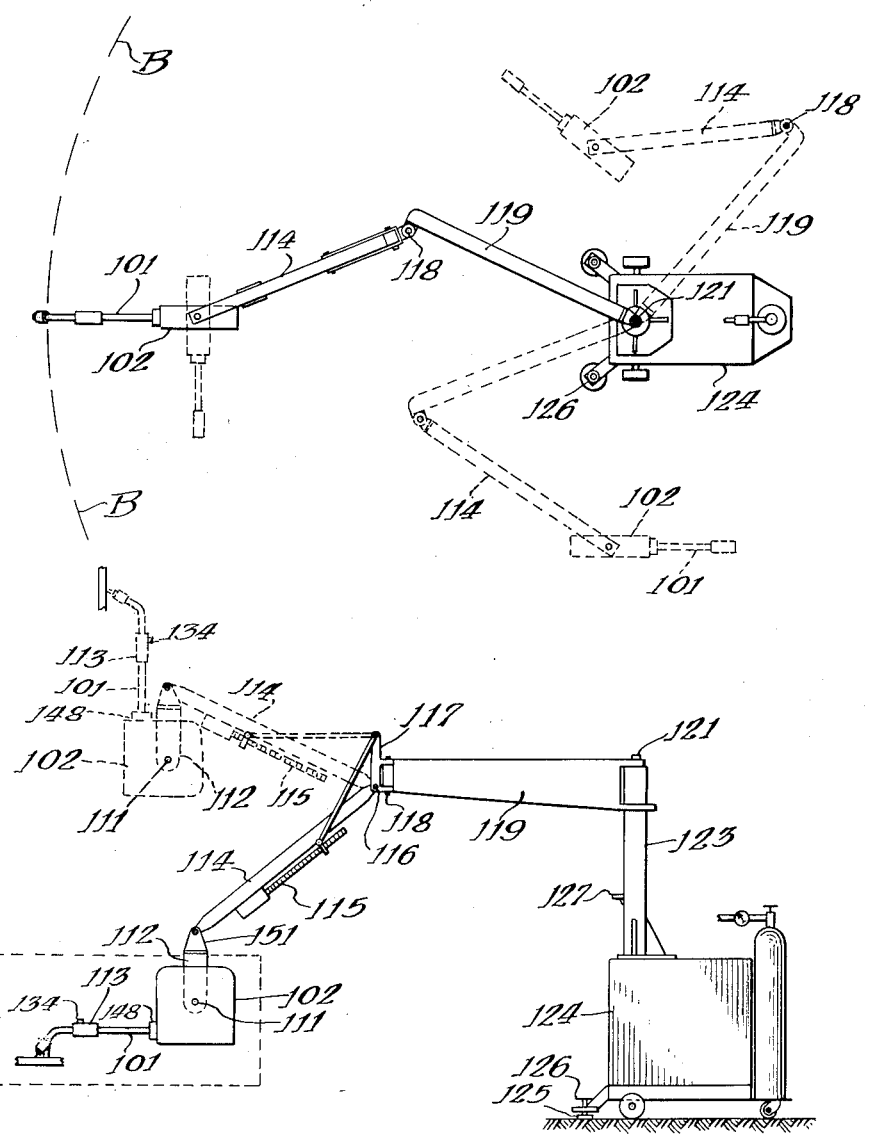

United States Patent Office 2,818,494
Patented Dec. 31, 1957

2,818,494

WELDING MACHINE

Arthur A. Bernard and Richard A. Bernard, Chicago, Ill.

Original application February 12, 1954, Serial No. 409,916. Divided and this application August 23, 1955, Serial No. 530,124

6 Claims. (Cl. 219—130)

This invention relates to welding apparatus and more particularly to semi-automatic apparatus for arc welding with continuous electrode.

This application is a division of our copending application Serial No. 409,916, filed February 12, 1954, now abandoned.

It is the principal object of this invention to provide a new and improved apparatus for depositing weld metal by electric arc processes.

A further object is to provide a welding apparatus which may be moved to the work and has a welding head universally manipulatable.

A further object is to provide a welding apparatus which by its structure permits welding with continuous electrode of any diameter without operator fatigue.

A further object is to provide an apparatus for electric arc welding permitting faster deposition of weld metal per man hour with use of larger diameter electrode than previously thought possible.

Other objects, features and advantages of the present invention will be apparent from the following detailed description of a preferred embodiment illustrated in the accompanying drawings in which:

Fig. 1 is a side elevational view of a portable welding unit embodying the invention and showing in dotted and full lines two positions to which the welding torch may be manipulated, Fig. 2 is a top plan view of unit illustrated in Fig. 1 showing various positions of the apparatus in full and dotted lines, Fig. 3 is an enlarged fragmentary view partially broken away of the welding torch and electrode cabinet illustrated in Figs. 1 and 2, and Fig. 4 is a fragmentary enlarged view partially broken away of the means for adjusting the position of the electrode cabinet illustrated in Figs. 1 and 2.

The apparatus herein disclosed may be particularly useful in depositing weld metal by use of the process and electrode disclosed in our copending application Serial No. 496,260, filed March 23, 1955, entitled "Welding with Blanket and Gas Arc-Shield." In the process therein disclosed the invention develops its full potential with automatic feeding of the electrode as in automatic welding or semi-automatic welding. In the latter the electrode is fed automatically, but the torch is moved manually. Aided by a new semi-automatic welding machine, the process can deposit from 3 to 8 times more pounds of electrode metal per man hour on a continuous basis than any other manual or semi-automatic welding process known.

One of the features of our new semi-automatic welding machine is that the size, hence the stiffness of large diameter electrodes, has no bearing on the ease of manual movement. By this is meant that 3/16" and 1/4" diameter electrodes, in coiled form, can be applied with the same ease of maneuverability and with no more effort or fatigue (actually less weight to support) than the manually applied fluxed electrode process. Hence with our new semi-automatic welding machine, the rate of electrode deposition can be the same as when the process is applied with fully automatic welding equipment. The present invention makes possible the satisfactory use of the new semi-automatic welding machine for steel, using large diameter electrodes. The fullest efficiency can now be brought to the job instead of moving the assembly to be welded to the automatic welding machine and taking time for careful placing and adjustment. This is especially important because there are weldments that weigh tons. The tremendous speed and hence the low labor cost of applying the present process with either automatic or semi-automatic equipment is evident by the following example: 1200 amperes can be used with 3/16" electrode when welding 5/8" plate thicknesses, or heavier, of common steel. With this current 100 inches, or one pound of electrode, is deposited per minute. Hence, as many pounds of electrode can be deposited in 8 minutes with the present process as can be deposited in one hour with the manually applied flux-coated electrode process.

In the present apparatus a coil of electrode and a welding torch through which the electrode is fed are physically positioned one to the other so that the relationship remains throughout the manipulation of the welding torch by an operator. Since the physical relationship of the welding torch and the coil of electrode does not change, larger diameter electrodes may be used. All flexible conduits which are usually associated with semi-automatic welding machines are avoided except as hereinafter noted.

As seen best in Fig. 3, torch 101 is preferably curved, and extends out from an electrode cabinet 102. The cabinet 102 is pivoted at 111 to a U-shaped bracket 112 so that by grasping the handle 113 the torch may be swung up and down. Counterweights are added, if necessary, to balance the torch about pivot 111 to at least within a pound at handle 113. In Fig. 1 the torch is shown in dotted lines swung about pivot 111 to a position suitable for welding a vertically extending bead. The dotted-line position in Fig. 1 also shows the electrode cabinet 102 at a higher elevation. This is accomplished by raising the elevating boom 114 by turning the screw 115. The boom 114 is pivoted at 116 to a fitting 117 which in turn is pivoted about a vertical axis at 118 to a swinging arm 119. The swinging arm is pivoted at 121 to a post 123 which is carried by a portable unit 124. The elevating screw 115 may be turned by a hand crank or by an electric motor 137.

As clearly indicated by comparison of the full and dotted lines in Fig. 2, the various pivotal connections about vertical axes permit manipulating the torch to virtually anywhere within the circle represented by the broken-line arc B.

The portable unit 124 preferably includes the necessary auxiliary welding equipment such as the welding transformer and controls for the welding circuit and the cylinder of compressed gas. When the portable unit 124 has been moved to a convenient position, pads 125 are preferably lowered to the floor by screws 126 and adjusted to dispose post 123 vertically so that gravity will not cause any swinging about the vertical axes. A dome type of spirit level 127 is preferably permanently installed to aid in this levelling operation.

The electrode is drawn from a reel 130 by a pair of feed rolls 131, at least one of which is driven by an electric motor 132. The reel is preferably freely pivoted on the axis of pivot 111 so as not to change the balance as it empties. The electric motor 132 is controlled as to speed by a controller 133 and is stopped and started by a button 134 on the handle 113. This button preferably also starts and stops the welding current, through suitable relays. As the electrode is drawn from the reel 130, it is straightened by straightening rolls 136, operating in cooperation with one of the rolls 131.

The feed rollers 131 feed the electrode 111 through a suitable guide tube and between bending rollers 138, which cooperate with a shoe or contact tube 139 to curve the electrode so it continues down through the nozzle 140 to the arc. The nozzle 140 is so positioned that the electrode will be centered in it and provide a uniform annular mouth through which the shielding gas will flow. One or more hoses 141 may be connected to an equal number of passages or conduits extending through the torch 101 to supply the shielding gas, and, if desired, to supply cooling water.

A guide finger 143 may be associated with the torch 101 near its welding end to cooperate with a guide-way which should be of insulating material or insulated from the work 144 being welded, but for many conditions unguided manual control will be preferred.

The torch 101 is preferably swivelled about the axis of a rearward or shank portion, so that its tip may be directed through a variety of angles for welding lap seams and the like. Swivelling to tilt the electrode at least 50 degrees to either side or straight downward is preferred.

The welding torch 101 is made of non-flexible tubular material so that the direction the tube takes in extending out of the cabinet 102 is constant even though the torch may be turned on its own axis to direct the electrode within the arc specified.

Current is carried to the electrode through the contact tube 139 which preferably can rock slightly to accommodate itself to the curvature of the electrode. The welding current cable 147 may be led directly to the torch head in which the contact tube 139 is located or it may be connected to a bushing 148, in which the torch 101 is swivelled.

The U-shaped bracket 112 is preferably swivelled about a vertical axis of a bolt to a connector 151, which in turn is swivelled about a horizontal axis to the elevating boom 114.

Any other type of torch and electrode feed may be used, though that may entail some loss of advantages. Any control of the welding current, voltage, electrode feed, etc., may be used, but a constant voltage system is preferred. In that case, no other automatic control is needed.

The various pivotal connections can preferably be locked against pivoting so that the welding can be fully automatic by moving the work past the torch by conventional means. The pivotal connections, especially those about vertical axes, are all provided with rolling anti-friction bearings so that the torch can be moved about with a slight pressure of say two ounces. Conventional automatic or semi-automatic welding units may be suspended in place of cabinet 102 and torch 101 with some impairment of convenience. If a semi-automatic unit is used, the flexible tube through which the electrode passes is preferably shortened so that with the electrode therein, it will have enough rigidity to function as does the torch 101 in moving its cabinet around.

A flexible tube may be substituted for the torch 101 providing that its characteristics are such that it has the same qualities as the torch 101 with regard to requiring the electrode to bend. With the present disclosed torch and cabinet structure very little bending of the electrode is required from the reel to the arc and generally no more bending than the electrode is subjected to in forming the coil. Within this limitation a flexible type of torch could be used as stated.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. Arc welding apparatus, comprising: a swingable support crane; a rotatable coil of electrode attached to the crane with a support having pivot means permitting universal movement of the coil relative to the crane; a welding torch mounted in fixed relation to the coil for receiving the electrode from the coil and directing it to a work piece, said torch and coil being movable as a unit relative to the crane and maintaining said fixed relation providing only predetermined bending of the electrode during feeding; an electrode supply and feeding unit attached to the crane, said unit including motor feed means for the electrode and an inflexible tube connected to the welding torch to receive the electrode from the feed means and deliver it to the torch, all universally movable as a unit relative to the crane, said electrode supply and feeding unit being balanced on the support crane to facilitate manipulation of the welding torch over a work piece.

2. Apparatus for arc welding with coiled electrodes, comprising: a cabinet for holding a coil of electrode; a welding torch extending out from the cabinet in predetermined fixed physical relation to the cabinet; an electrode feed means mounted in the cabinet to draw electrode from a coil therein into the torch, said torch and cabinet fixed relation providing a non-varying path for the electrode during feeding; and a swingable support crane having means at one end supporting the cabinet for universal movement relative to the crane whereby said torch may be manipulated over a work piece while maintaining said physical relation between the torch and cabinet.

3. Arc welding apparatus, comprising: a cabinet for holding an electrode supply coil; a non-flexible welding torch secured to the cabinet and extending outwardly therefrom in a predetermined fixed direction relative to the cabinet and adapted to guide the electrode through a predetermined path; an electrode feed means mounted within the cabinet for feeding electrode continuously from a coil within the cabinet into the torch, said cabinet having means mounting said coil in fixed position relative to said torch; and a swingable support crane having bracket means at one end attached to the cabinet, said bracket having pivot means permitting universal movement of the cabinet and torch as a unit relative to the support crane for manual positioning of the electrode for welding.

4. Arc welding apparatus as specified in claim 3 wherein the torch is a tubular non-flexible member having passages therein for the electrode, cooling fluid and arc enveloping gas.

5. Portable arc welding apparatus, comprising: a base supporting unit having an upstanding column and an elevated arm generally horizontally swingably attached to the column; a boom secured to an outer end of the arm for adjusting movement in an upright direction; an electrode supply cabinet secured to an outer end of the boom with bracket means permitting universal movement of the cabinet relative to the arm; a non-flexible welding torch secured to the cabinet and extending outwardly therefrom in a fixed direction relative to the cabinet, said cabinet having electrode coil mounting means adapted to hold a coil of electrode in fixed relative position to said torch; electrode feed means mounted within the cabinet to feed continuous electrode from a supply in the cabinet into the torch; and said torch having a handle portion for manual movement of the torch and cabinet as a unit to correctly position the electrode during welding on a work piece without varying bending of the electrode during feeding.

6. Portable arc welding apparatus as specified in claim 5 wherein said cabinet is balanced on the boom for easy manipulation of the torch and the torch has a welding nozzle curved at its end remote from the cabinet with the torch being rotatable about said fixed direction of the torch relative to the cabinet to swing the nozzle through an arc and further position the electrode.

References Cited in the file of this patent

UNITED STATES PATENTS

| | | |
|---|---|---|
| 2,344,775 | Holslag | Mar. 21, 1944 |
| 2,402,937 | Stringham | June 25, 1946 |
| 2,445,863 | Sarazin | July 27, 1948 |
| 2,510,205 | Baird | June 6, 1950 |
| 2,571,684 | Craven | Oct. 16, 1951 |
| 2,719,245 | Anderson | Sept. 27, 1955 |
| 2,723,331 | Tyrner | Nov. 8, 1955 |

FOREIGN PATENTS

| | | |
|---|---|---|
| 191,704 | Great Britain | Oct. 11, 1922 |